United States Patent
Bi et al.

(10) Patent No.: US 7,349,174 B2
(45) Date of Patent: Mar. 25, 2008

(54) SOFT SENSOR FOR OPERATING SHOCK IN A DISC DRIVE

(75) Inventors: Qiang Bi, Singapore (SG); Xiong Liu, Singapore (SG); LeeLing Tan, Singapore (SG); Wen-Jun Cao, Singapore (SG); ChoonKiat Lim, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 1018 days.

(21) Appl. No.: 10/143,137

(22) Filed: May 9, 2002

(65) Prior Publication Data

US 2003/0103286 A1 Jun. 5, 2003

Related U.S. Application Data

(60) Provisional application No. 60/335,259, filed on Nov. 15, 2001.

(51) Int. Cl.
*G11B 5/596* (2006.01)

(52) U.S. Cl. .................. 360/78.09; 360/31
(58) Field of Classification Search ........... 360/60, 360/53, 75
See application file for complete search history.

(56) References Cited

U.S. PATENT DOCUMENTS

| | | | | |
|---|---|---|---|---|
| 4,575,776 A * | 3/1986 | Stephens et al. | ......... | 360/78.09 |
| 5,235,472 A | 8/1993 | Smith | ......... | 360/60 |
| 5,471,381 A * | 11/1995 | Khan | ......... | 700/48 |
| 5,483,438 A * | 1/1996 | Nishimura | ......... | 360/75 |
| 5,654,840 A * | 8/1997 | Patton et al. | ......... | 360/75 |
| 5,777,815 A | 7/1998 | Kasiraj et al. | ......... | 360/75 |
| 5,875,066 A * | 2/1999 | Ottesen | ......... | 360/75 |
| 5,907,258 A | 5/1999 | Chen | ......... | 327/557 |
| 5,917,672 A * | 6/1999 | Pham et al. | ......... | 360/78.09 |
| 5,940,239 A * | 8/1999 | Lee et al. | ......... | 360/77.02 |
| 5,986,845 A * | 11/1999 | Yamaguchi et al. | ......... | 360/75 |
| 6,046,878 A * | 4/2000 | Liu et al. | ......... | 360/75 |
| 6,108,163 A | 8/2000 | Boutaghou | ......... | 360/97.02 |
| 6,115,200 A | 9/2000 | Allen et al. | ......... | 360/60 |
| 6,122,131 A * | 9/2000 | Jeppson | ......... | 360/77.02 |

(Continued)

*Primary Examiner*—Andrea Wellington
*Assistant Examiner*—Varsha A. Kapadia
(74) *Attorney, Agent, or Firm*—David K. Lucente; Derek J. Berger (57) ABSTRACT

A method of preventing a write operation to a disc in a disc drive during a shock event without the use of a separate shock sensor comprises steps of monitoring an actuator voice coil motor (VCM) control plant output signal, generating an actuator voice coil motor (VCM) plant model module output signal, comparing the VCM plant model module output signal to the VCM control plant module output signal to produce a difference signal, and triggering a write protect gate if the difference signal exceeds a predetermined threshold value. The system comprises a voice coil motor (VCM) control plant module sensitive to a shock event providing a VCM control plant module output, a voice coil motor (VCM) plant model module initially insensitive to the shock event producing a VCM plant model module output, a first comparator module coupled to receive the VCM control plant module output and the VCM plant model module output, operable to generate a difference signal between the model plant module output and the VCM control plant module output, and a triggering module receiving the difference signal for generating a write protect gate signal if the difference signal exceeds a predetermined shock threshold.

26 Claims, 6 Drawing Sheets

U.S. PATENT DOCUMENTS

| | | | |
|---|---|---|---|
| 6,226,140 B1 | 5/2001 | Serrano et al. | 360/60 |
| 6,243,226 B1* | 6/2001 | Jeong | 360/78.07 |
| 6,313,964 B1 | 11/2001 | Lamberts et al. | 360/75 |
| 6,337,777 B1* | 1/2002 | Matsubara et al. | 360/53 |
| 6,545,838 B1* | 4/2003 | Burton | 360/78.06 |
| 6,614,615 B1* | 9/2003 | Ju et al. | 360/78.04 |
| 6,680,812 B1* | 1/2004 | Iwashiro | 360/53 |

* cited by examiner

SOFT SENSOR FOR OPERATING SHOCK IN A DISC DRIVE

RELATED APPLICATIONS

This application claims priority of U.S. provisional application Ser. No. 60/335,259, filed Nov. 15, 2001.

FIELD OF THE INVENTION

This application relates generally to disc drive servo control systems and more particularly to a method, system and apparatus for early detection of shock events in an operating disc drive.

BACKGROUND OF THE INVENTION

Disc drive storage capacity has been increasing dramatically recently. This means that the data tracks per inch (TPI) on a disc surface increases in order to pack more data on a given surface area of the disc. One of the challenges facing disc drive designers is data integrity. Data integrity problems become more pronounced and difficult to handle as the tolerances of tracks and between tracks become tighter. When the track pitch falls below 200 μin, maintaining the data heads within the acceptable limits of track center becomes very difficult. A shock of fairly short duration (less than 5 msec) can knock the head far off a track. External shock or vibration, during a read operation, may cause a 'soft data error'. The desired data can be recovered from read retries and data throughput is then affected. If the head is knocked off a track while the data is being written, then the old data may be overwritten and become permanently lost. This is commonly known as a 'hard data error'. To ensure data integrity, the write gate is turned off to prevent write current from reaching the head and thus the hard data error from occurring when an excessive shock is sensed.

A shock sensor mounted a drive can sense the incoming shock well before the position error signal (PES) goes beyond the write fault threshold. This is because the head is under closed loop control and the control system will try to keep the head on track via closed loop control when a shock comes in. A shock sensor is an analog device. It can continuously monitor the external shock. When a shock sensor detects a shock, it will turn off the write gate to prevent permanent data being lost on the disk. Disadvantages of the use of dedicated shock sensors are: (1) additional cost; and (2) potentially sensing the wrong trigger, which may lower the data throughput.

More accurate detection can be accomplished using two axis shock sensors. Other shock detection schemes using hardware have also been proposed such as utilizing the back electromotive force (EMF) signal of the actuator to sense an incoming shock. Another approach is to use staggered servo wedges on different heads to achieve a higher sampling rate on head position, and thus, a faster detection of a shock event. However, in this latter case, the scheme cannot be applied to a single head drive, and it requires 2 read channels in the servo control system that, in turn, increases the cost.

In many low cost drive designs external shock is sensed from the Position Error Signal (PES) as a read head passes over a servo sector on a disc surface. Due to the limitations such as drive format efficiency and microprocessor bandwidth in low cost drives, the number of servo sectors on a track does not grow as fast as does the number of tracks per inch (TPI). In a higher TPI drive, therefore, the sector-to-sector transition time is relatively longer. In these drives, when a shock event occurs, a head may go further off of a track before the control system senses a shock from the PES. Currently, the write fault detection in a typical conventional drive is based on the following conditions:

$$PES(k) > \text{WriteFaultThreshold or} \quad (i)$$

$$2*PES(k)-PES(k-1)=PES(k)+[PES(k)-PES(k-1)]$$
$$=\text{Predict\_}PES(k+1) > 1.4*\text{WriteFaultThreshold} \quad (ii)$$

where "k" is a track sector index. "WriteFaultThreshold" is for example, set to 15% of track pitch (TP). The control system checks the value of the current sector PES and the predicted PES for the next sector. If they are greater than the thresholds, the control scheme will turn off the write gate. In this conventional scheme, the PES is delayed, compared to the time when shock comes in, due to the closed loop control. So, the write fault detection may also be delayed. It has been observed that sometimes the actual write fault detection is a bit late. In other words, at the time the servo gate is actually switched off, the PES is greater than the WriteFaultThreshold already. In other words, the head position is further off track than desired when the servo gate is actually switched off, which could permit write errors to occur. Accordingly there is a need for a shock event detection system that senses a shock event sooner and thus precludes such write errors from occurring.

SUMMARY OF THE INVENTION

Against this backdrop the present invention has been developed. The present invention provides a solution to this and other problems, and offers other advantages over the prior art. An embodiment of the present invention is a scheme that detects the shock event before the PES goes beyond the write fault threshold based on the disturbance observer concept. Such a scheme will be called a soft shock detection system. This soft shock detection system is preferably embodied within firmware of the servo control system and does not require any additional hardware in the disc drive. The soft shock detection system utilizes a disturbance observer concept, preferably implemented in firmware, to monitor the voice coil motor (VCM) plant module output, since it will be affected by a shock, as it is affected by a shock event, compare its actual output to a model output signal of a VCM plant model module, that is insensitive to a shock event, to generate a shock detection signal that is then used to trigger a write protect gate in advance of the write head moving beyond a predetermined threshold distance off track center.

The method in accordance with an embodiment of the invention basically involves monitoring an actuator voice coil motor (VCM) control plant module output signal, monitoring an actuator voice coil motor (VCM) plant model module output signal, comparing the VCM plant model module output signal to the VCM control plant module output signal to produce a difference signal, and triggering a write protect gate if the difference signal exceeds a predetermined threshold value. This shock detection method is predictive. Because it compares the head behavior via the PES through the VCM control plant module to a VCM model, it thus anticipates the head movement off track and triggers the write protect gate prior to the head moving to a position where a write error could occur.

These and various other features as well as advantages which characterize the present invention will be apparent from a reading of the following detailed description and a review of the associated drawings.

DETAILED DESCRIPTION

Figure 1:
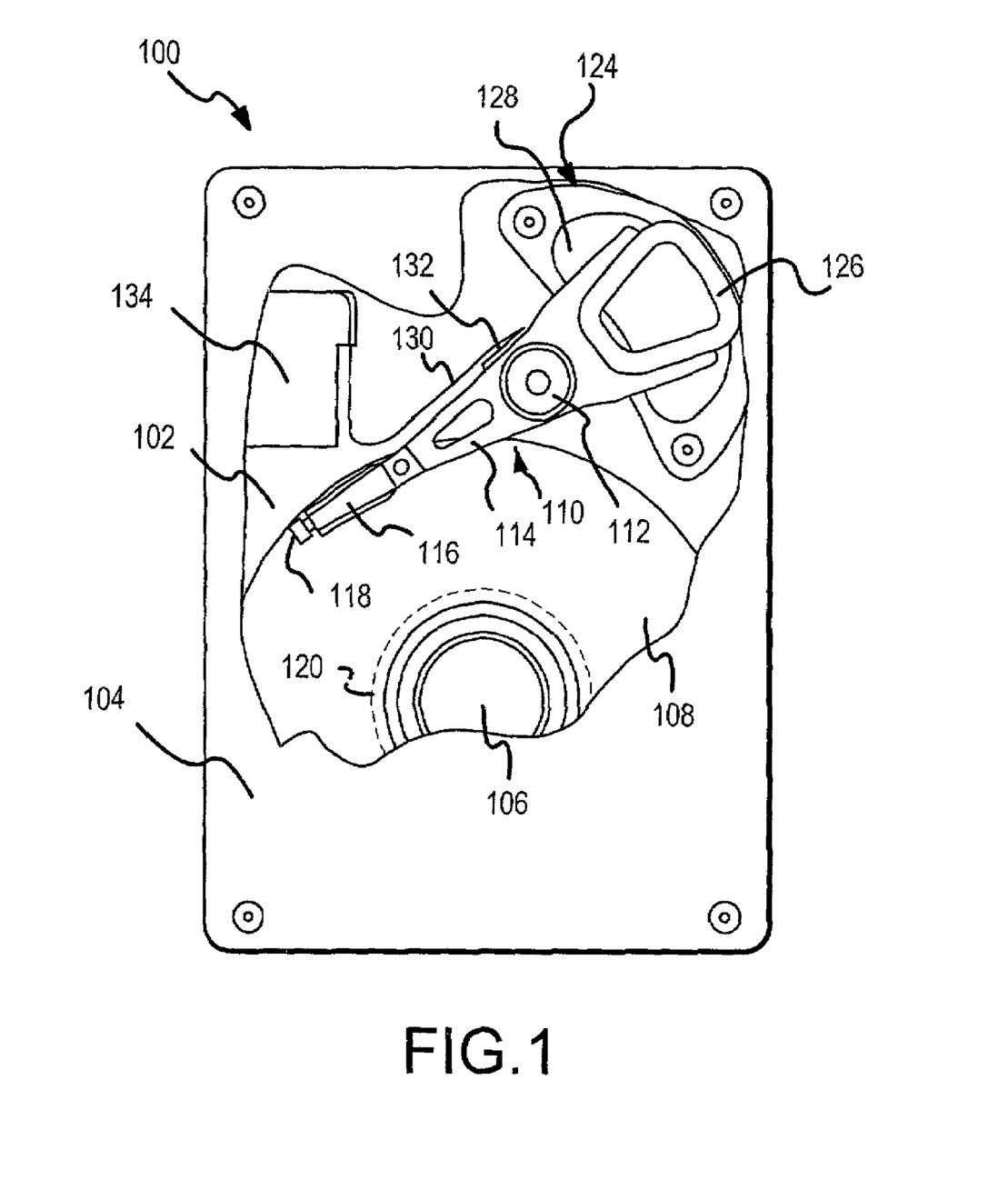
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 that rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are typically moved over a park zone 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier module for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
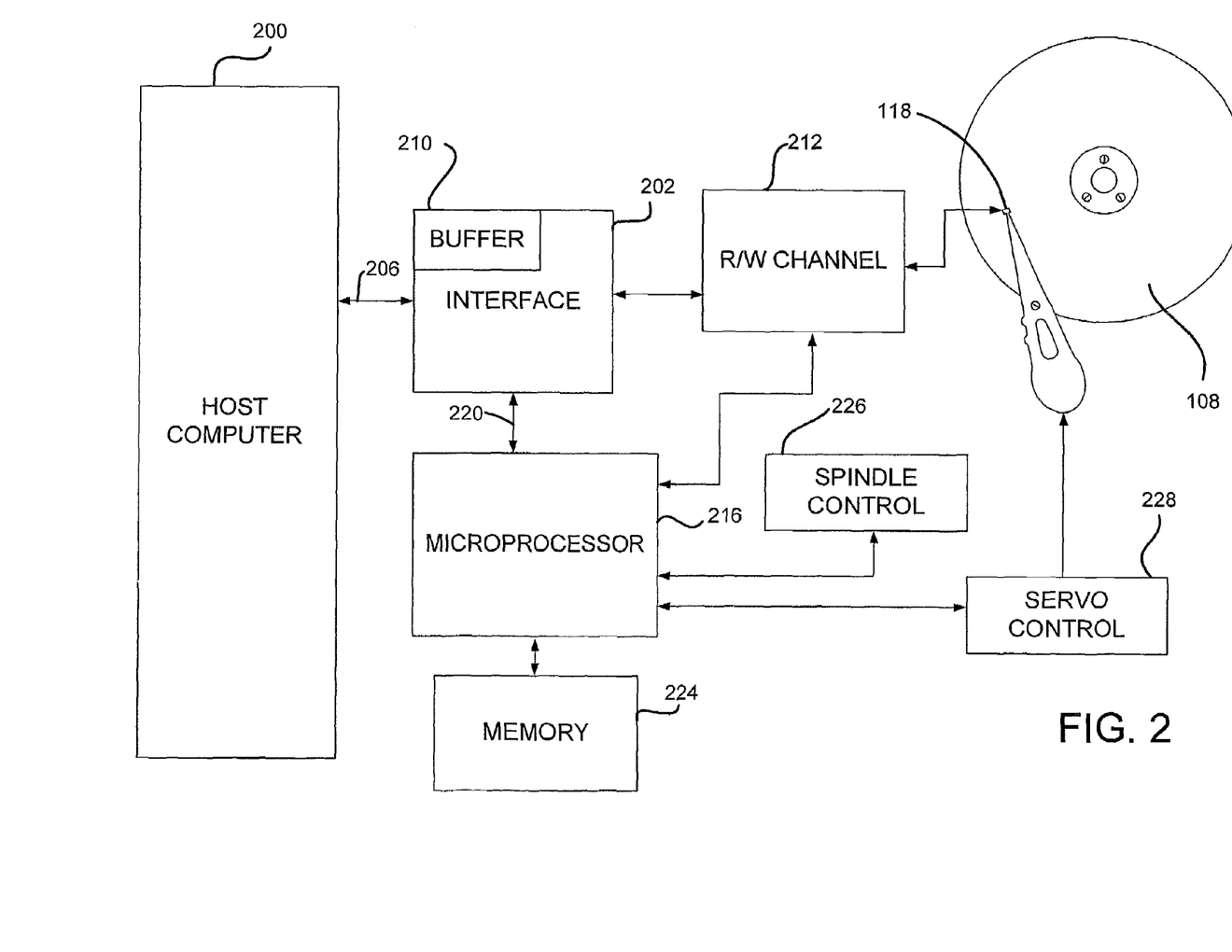
FIG. 2 is a block diagram of the servo control system of the disc drive shown in FIG. 1.

Referring now to FIG. 2, shown therein is a functional block diagram of the disc drive 100 of FIG. 1, generally showing the main functional circuits which are typically resident on a disc drive printed circuit board and which are used to control the operation of the disc drive 100. As shown in FIG. 2, the host 200 is operably connected to an interface application specific integrated circuit 202 via control, data, and interrupt lines 206. The interface 202 typically includes an associated buffer 210 which facilitates high speed data transfer between the host 200 and the disc drive 100. Data to be written to the disc drive 100 are passed from the host to the interface 202 and then to a read/write channel 212 via control, data and interrupt lines. The read/write channel encodes and serializes the data for write operations and decodes the read data read during a read operation.

The read/write channel 212 also provides the requisite write current signals to the heads 214. To retrieve data that has been previously stored by the disc drive 100, read signals are generated by the heads 118 and provided to the read/write channel 212, which processes and outputs the retrieved data to the interface 202 for subsequent transfer to the host 100. Such operations of the disc drive 200 are well known in the art and are discussed, for example, in U.S. Pat. No. 5,276,662 issued Jan. 4, 1994 to Shaver et al.

As also shown in FIG. 2, a microprocessor 216 is operably connected to the interface 202 via lines 220. The microprocessor 216 provides top level communication and control for the disc drive 100 in conjunction with programming for the microprocessor 216 which is typically stored in a microprocessor memory 224. The memory 224 can include random access memory (RAM), read only memory (ROM) and other sources of resident memory for the microprocessor 216. Additionally, the microprocessor 216 provides control signals for spindle control 226, and the servo control loop 228. The code for the present invention preferably resides in the memory 224 and involves the interaction of closed loop control including the servo control 228, the heads 118, the read/write channel 212 and the microprocessor 216.

The embodiments of the invention described below are preferably viewed as and implemented as logical steps in the firmware of a disc drive control scheme. The logical operations of the present invention are preferably implemented (1) as a sequence of processor-implemented steps executing in one or more computer systems or subsystems or (2) as interconnected machine modules within one or more computer systems. The implementation is a matter of choice, dependent on the performance requirements of the disc drive computer system implementing the invention. Accordingly, the logical operations making up the embodiments of the invention described herein are referred to variously as operations, steps, or modules.

Figure 3:
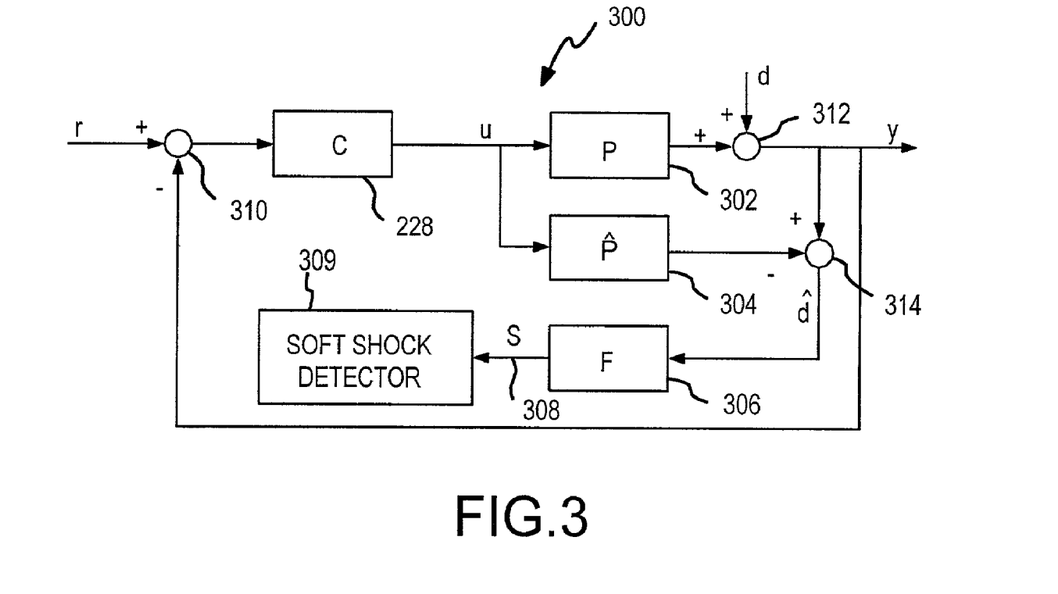
FIG. 3 is a disturbance observer block diagram of a basic soft shock detector scheme in accordance with the present invention.

A soft shock detection scheme 300 in accordance with an embodiment of the present invention is incorporated in control firmware in memory 224 for operation of the servo control module 228 in the disc drive 100. A feedback control model of the soft shock detection scheme 300 is shown in FIG. 3. In FIG. 3, "C" is the servo control module 228, "P" represents the VCM control plant module 302, "P̂" is the VCM plant model module 304 (here a double integrator is used, which is quite accurate for a low frequency range of 100 Hz to 2000 Hz), "F" is a low pass filter 306, d is the lump-sum shock disturbance, and "d̂" is the estimated disturbance.

In this scheme 300, the input "r" represents the target track. Input "r" is fed through a comparator module 310 to the servo control module 228. The servo control module output signal "u", which equates to the signal required to get to the target track from the current head position "y", is fed to both the VCM control plant module 302 and the VCM plant model module 304. The difference between the output of the VCM control plant module 302 and the output of the VCM plant model module 304 approximates to the disturbance "d", thus is sensitive to perturbations caused by external events such as an external shock event. In contrast, the output of VCM plant model module 304 is initially less sensitive to the perturbations caused by a shock event.

The output of the VCM control plant module 302 is fed to a summer module 312 that adds the VCM control plant module output to a disturbance "d". The output of the summer module 312, which is the actual head position "y", is in turn fed to a comparator module 314. The output of the VCM plant model module 304 is also fed to the comparator module 314. The output of the comparator module 314 produces a predicted difference value, i.e. how far the head is from the model position, which is fed to the filter module 306. The filtered difference signal 308 "s" is used in the soft shock detector trigger module 309 to trigger the write protect gate.

In the scheme 300 shown in FIG. 3, the estimated disturbance is:

$$\hat{d}=Pu+d-\hat{P}u \tag{1}$$

As $\hat{P}$ is very close to P in low frequency range of 100 Hz to 2000 Hz and a typical shock disturbance d also falls in that range (normally, a shock is defined as 2 msec half sine signal), we have:

$$\hat{d} \approx d \tag{2}$$

The method of preventing a write operation to a disc in a disc drive during a shock event may be viewed as including steps of:

(a) monitoring the actuator voice coil motor (VCM) control plant module output signal;

(b) generating an actuator voice coil motor (VCM) model plant module output signal;

(c) comparing the VCM plant model module output signal to the VCM control plant module output signal to produce a difference signal; and (d) triggering a write protect gate if the filtered difference signal exceeds a predetermined threshold value.

Figure 4:
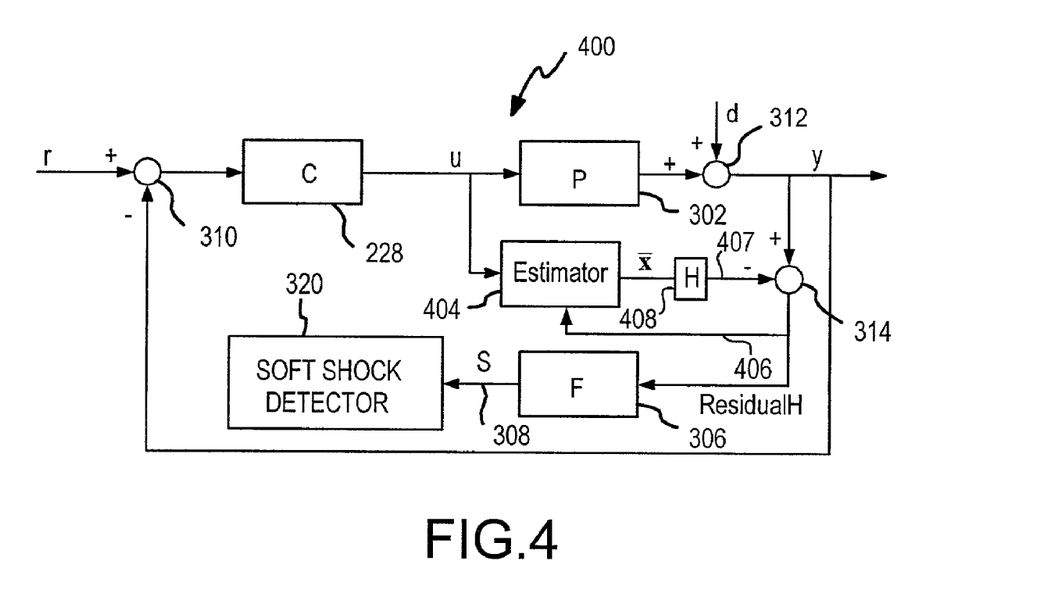
FIG. 4 is a disturbance observer block diagram of another soft shock detector scheme in accordance with the present invention.
Figure 5:
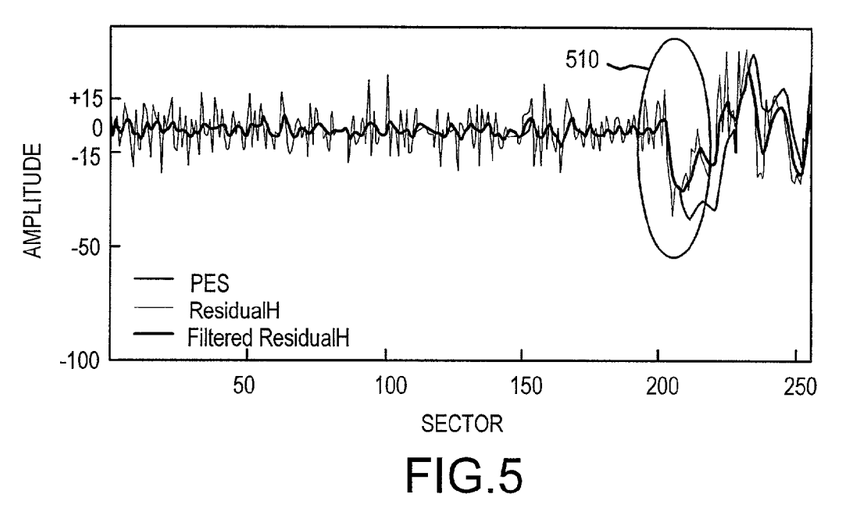
FIG. 5 is a graph of a 10 g half sine shock event applied to a disc drive showing the Position Error Signal responses verses sector number utilizing the soft shock detector scheme shown in FIG. 4.

A more specific example of a scheme 400 in accordance with a preferred embodiment is shown in FIG. 4. Here, like numbers will be utilized to indicate like functional blocks as shown in FIG. 3. Thus, in scheme 400, operation of the scheme is as described above with reference to FIG. 3, except in this embodiment 400, the model module 304 is a more refined VCM plant model module with feedback, called a VCM plant estimator module 404. The output "x̄" of the estimator module 404 is an estimate of the head position, estimated head velocity and estimated bias. However, x̄ is a vector quantity that is three dimensional [y position predicted, velocity predicted, and bias predicted]. This output x̄ goes through module "H", which multiplies the vector x̄ by [1,0,0] to extract the y predicted component, which is the head position estimation 407. The estimated head position 407 is then directed into the comparator module 314 along with the summer 312 output "y". A feedback of the difference (y−H*x̄) signal 406 from the comparator module 314 is returned to the VCM plant estimator module 404 as an input. The difference signal output of the comparator module 314, designated as "ResidualH" in FIG. 4, is also fed into the filter module 306 The filtered "ResidualH" signal 308, or "s", is in turn fed to the trigger module 320 in FIG. 4.

During a shock event, "ResidualH" response is faster than that of PES as will be shown below. A brief mathematical proof of this operation follows.

In the scheme 400, the predictor is:

$$\bar{x}(k)=\Phi\hat{x}(k-1)+\Gamma u(k-1), \tag{3}$$

where x̄(k) is the partially estimated state vector for position, velocity, bias force, etc., k is the sampling index, and u is the control input.

Current Estimator output of the scheme 400 is given by:

$$\hat{x}(k)=\bar{x}(k)+L[y(k)-H\bar{x}(k)], \tag{4}$$

where x̂(k) is the fully estimated state vector, H is the output vector, and L is the estimator gain vector.

From equations (3) and (4), we have:

$$\bar{x}(k+1)=\Phi\bar{x}(k)+\Gamma u(k)+\Phi L[y(k)-H\bar{x}(k)]. \tag{5}$$

The plant after discretization becomes below $$x(k+1)=\Phi x(k)+\Gamma u(k)+\Gamma_1 d(k), \tag{6}$$

$$y(k)=Hx(k), \tag{7}$$

where x(k) is the state factor, the shock disturbance d(k) enters the plant with a input vector $\Gamma_1$, and y(k) is the actual position.

If we define that:

$$\tilde{x}(k)=\bar{x}(k)-x(k). \tag{8}$$

then equations (4), (5) and (8) lead to:

$$\begin{aligned}\tilde{x}(k+1) &= \Phi\tilde{x}(k)+\Phi L[y(k)-H\bar{x}(k)]-\Gamma_1 d(k) \\ &= \Phi\tilde{x}(k)+\Phi L[Hx(k)-H\bar{x}(k)]-\Gamma_1 d(k) \\ &= (\Phi-\Phi LH)\tilde{x}(k)-\Gamma_1 d(k).\end{aligned} \tag{9}$$

So, the current shock observer is a system:

$$\tilde{x}(k+1)=(\Phi-\Phi LH)\tilde{x}(k)-\Gamma_1 d(k) \tag{10}$$

$$\begin{aligned}ResidualH(k) &= y(k)-H\bar{x}(k) \\ &= H\tilde{x}(k)\end{aligned}$$

where shock d(k) is the input, ResidualH is the output. [Φ−ΦLH] determines the observer poles. Normally, in state feedback design, the poles of an observer are 5~10 times faster than that of the closed loop (determined by K in state feedback). Thus, the ResidualH response is faster than that of PES during a shock.

ResidualH is quite noisy and a filter is needed.

$$BiasEstimateH(k+1) = BiasEstimateH(k) + L3*ResidueH$$

or $$BiasEstimateH(z) = \frac{L3}{Z-1} ResidualH.$$

A Bode plot of $$\frac{L3}{Z-1}$$

shows that the phase delay for $$\frac{L3}{Z-1}$$

is too large. If using it as the signal for shock detection, it will be too late in some cases. Therefore a low pass filter "F", module 306 shown in FIGS. 3 and 4, can be designed to remove unwanted noise. In the following examples, a first order Butterworth filter with bandwidth of 1.7 KHz is designed to simplify the computation. There may be a gain in the filter "F", based on the threshold size and "ResidualH" amplitude.

Exemplary criteria for disabling the Write Gate is based on the signal 308 in FIG. 3. These are:

$$s(k) > WriteFaultThreshold \text{ or} \quad (i)$$

$$2*s(k) - s(k-1) = Predict\_s(k+1) > 1.4*WriteFault-\\ Threshold, \quad (ii)$$

where s=F*ResidualH.

In the illustrated embodiments in this specification, the above two criteria are utilized. Other criteria may also or alternatively be used such as those that contain the filtered ResidualH signal for the write gate trigger.

FIRST EXAMPLE

Operating shock tests were performed on an operating disc drive. The tested drive has 180 servo sectors and is driven at 5400 rpm. Sector time is 61.7 μsec. In a shock event, the values of PES, "ResidualH" are dumped from the drive and plotted for shock detection analysis. The resulting plots are shown in FIGS. 5 through 8. Here the criteria for disabling the write gate are:

$$s(k) > 15\% \text{ Track Pitch } (TP) \text{ or } (2*s(k) - s(k-1)) >= 21\% TP$$

Figure 6:
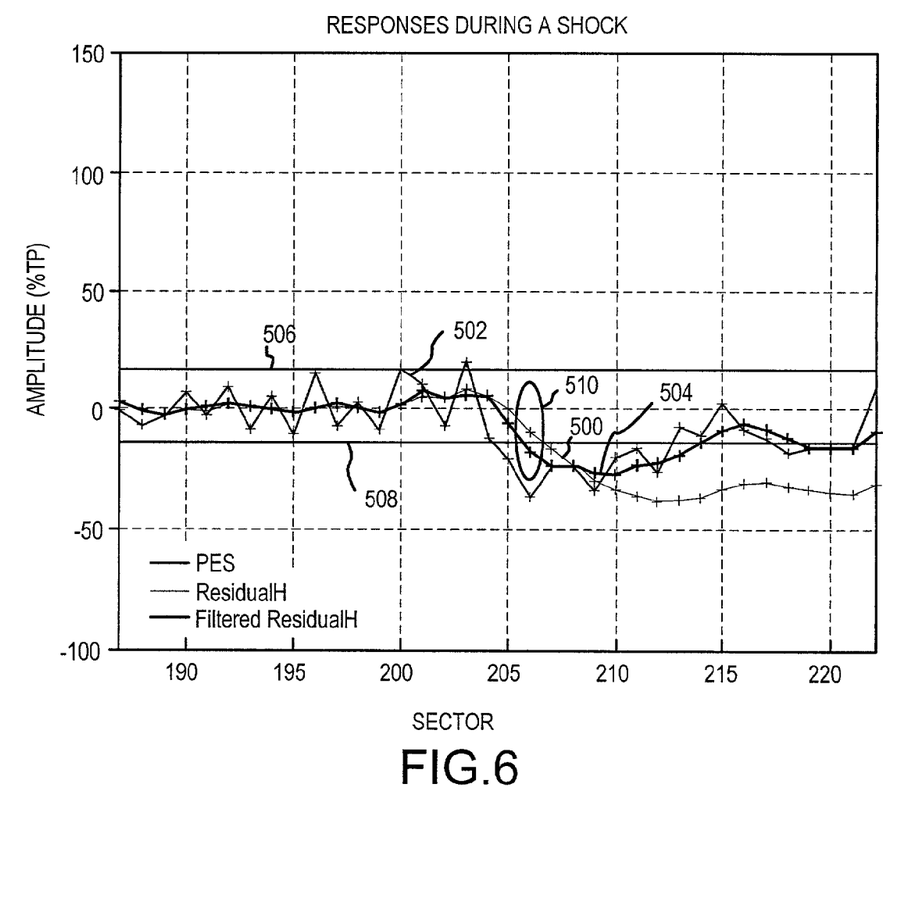
FIG. 6 is an expanded graph of a portion of the graph in FIG. 5 around the shock event.

A 10 g half-sine shock with duration of 2 msec was applied to the drive. The response of PES (black fine line) 500 and ResidualH (medium black line) 502 are plotted along with filtered ResidualH (heavy black line) 504. An expanded view of the region around sector 200 is shown in FIG. 6. Two horizontal lines 506 and 508 shows that 15% TP bounds. ResidualH 502 leads the PES signal 500 when the shock, indicated by the oval area 510, comes in. At sector 205, ResidualH 502 falls below or out of the 15% amplitude window. The ResidualH 502 is a bit noisy and cannot be used directly. The filtered ResidualH 504, which corresponds to signal 308 in FIG. 4, detects the excessive shock at Sector 206 and can be used to turn off the write gate immediately. Note, at this time, that the PES signal 500 is still within tolerance, at −9% TP and 2*PES(n)−PES(n−1) is also within the bound of 21%. It is still within the write fault threshold. At sector 206, PES 500 and predicted PES is still within safe range. Thus, based on the old criteria, the write fault would not be triggered until sector 207. However, at sector 207, the PES (−16% TP) is beyond the write fault threshold. If the filtered residualH is used to detect the event, the write fault threshold is reached earlier and the write fault trigger will be issued sooner.

The following Table 1 shows that the new shock detection is 1 sector earlier than that of the old or conventional shock detection scheme. The new scheme can turn the write gate off just in time, i.e., when the head 118 is still in the safety range when the write gate is turned off.

TABLE 1

| Sector | 203 | 204 | 205 | 206 | 207 | 208 | 209 |
|---|---|---|---|---|---|---|---|
| PES (% TP) | 9 | 7 | 1 | −9 | −16 | −22 | −29 |
| 2*PES(n)-PES(n-1) | 12 | 5 | −4 | −18 | −23 | −28 | −36 |
| DisableWrtGate | 0 | 0 | 0 | 0 | 1 | 1 | 1 |
| DisableWrtGateNew | 0 | 0 | 0 | 1 | 1 | 1 | 1 |
| s(n) | −7 | −6 | 5 | 17 | 23 | 23 | 26 |
| 2*s(n)-s(n-1) | −8 | −5 | 16 | 29 | 30 | 22 | 28 |

SECOND EXAMPLE

Figure 7:
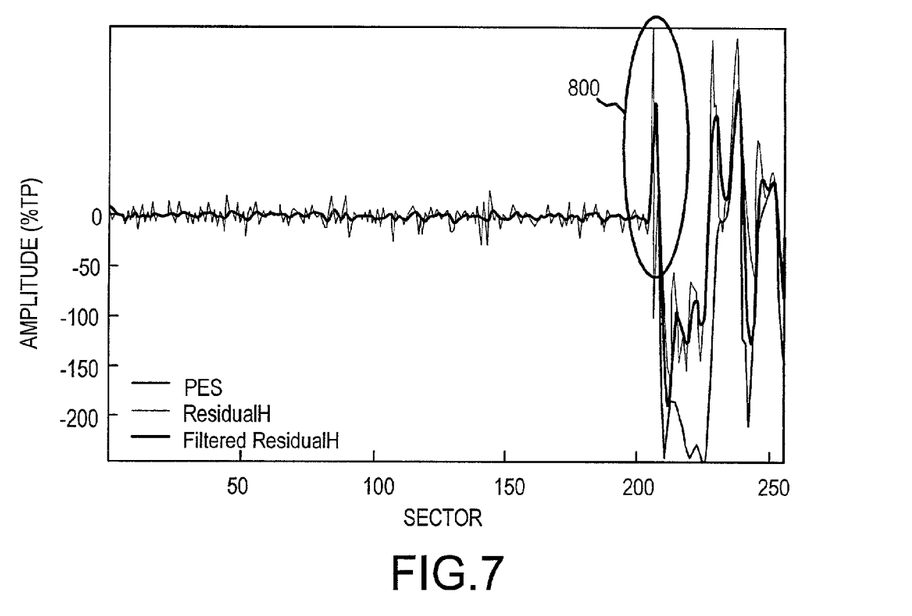
FIG. 7 is a graph of a 30 g half sine shock event applied to a disc drive showing the Position Error Signal responses verses sector number utilizing the soft shock detector scheme shown in FIG. 4.
Figure 8:
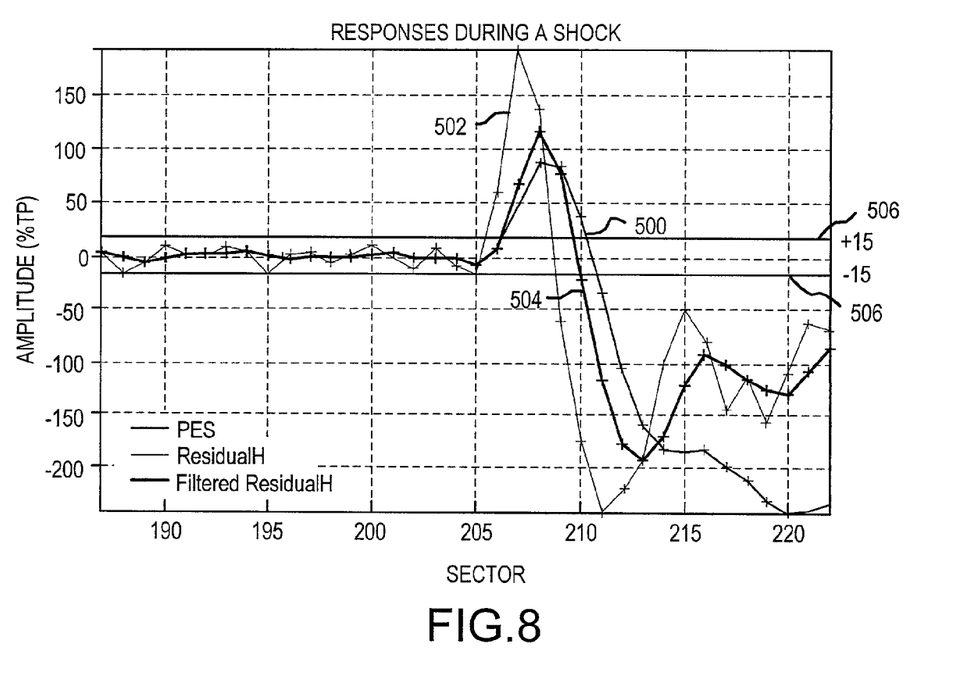
FIG. 8 is an expanded graph of a portion of the graph in FIG. 7 around the shock event.

In this example, a 30 g half-sine shock with duration of 2 msec is applied to a drive as in the first example. In this case, the response is more dramatic because of the shock magnitude difference. The response of the PES 500, filtered ResidualH 504 and ResidualH 502 are shown in FIGS. 7 and 8. FIG. 7 shows the response over 250 sectors, while FIG. 8 is an expanded view of the circled portion 800 at the time of the shock event. In this example, ResidualH 502 clearly 'feels' the shock earlier than that of PES 500. The filtered ResidualH 504 detects the shock 1 sector before the one based on old criteria. Using old scheme, when the write fault is detected, the head is already 47% TP off the track center as illustrated in the Table 2 below.

TABLE 2

| Sector | 203 | 204 | 205 | 206 | 207 | 208 | 209 |
|---|---|---|---|---|---|---|---|
| PES (% TP) | 0 | −2 | 5 | 5 | 47 | 88 | 83 |
| 2*PES(n)-PES(n-1) | 0 | −4 | −10 | 15 | 89 | 128 | 78 |
| DisableWrtGate | 0 | 0 | 0 | 0 | 1 | 1 | 1 |
| DisableWrtGateNew | 0 | 0 | 0 | 1 | 1 | 1 | 1 |
| s(n) | 1 | 1 | 7 | 7 | −67 | −117 | −77 |
| 2*s(n)-s(n-1) | 2 | 1 | 13 | 22 | −127 | −166 | −37 |

Figure 9:
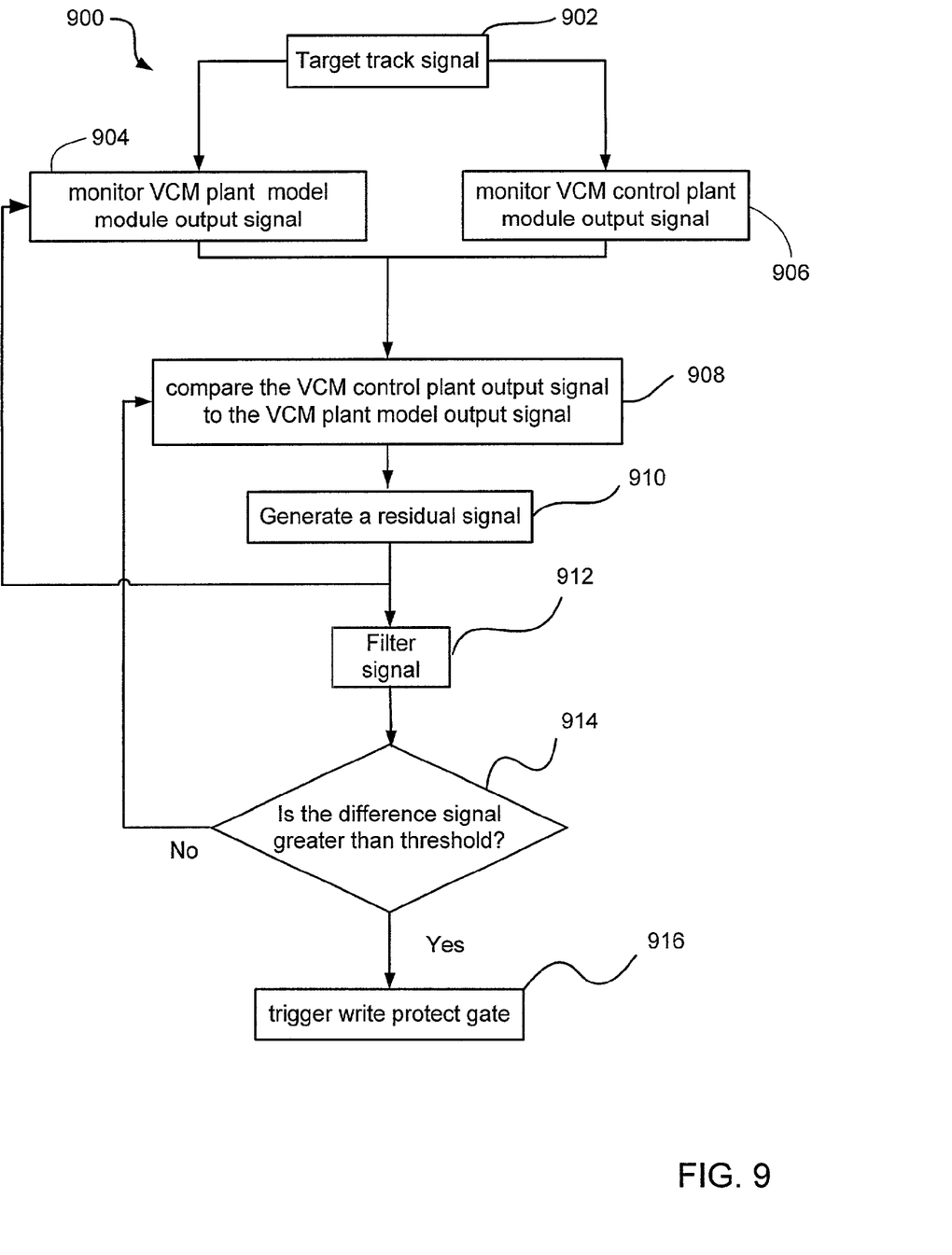
FIG. 9 is an operational flow diagram of the soft shock sensor in accordance with an embodiment of the present invention.

FIG. 9 is a process flow diagram 900 of the module operations in an exemplary embodiment of the present invention as described above with reference to FIGS. 3 and 4. More particularly, the track signal of the desired target track "r" is fed in operation 902 through the servo control module 228. The servo control module 228 output is provided to the VCM plant model module 304, and also to the VCM control plant module 302 in operations 904 and 906.

In operation 904, the target track signal is supplied to the VCM plant model module 304 and the model output signal is generated. In operation 906, the target track signal is supplied to the VCM control plant module and a VCM control plant module output signal is generated. These two output signals are compared in operation 908. This operation is performed in comparator module 314 in FIGS. 3 and 4. Control then transfers to operation 910 in which the comparator module 314 produces a first difference signal (y−H*x̄), e.g. "ResidualH". This difference signal (such as 406) is also fed back to operation 904. Control then transfers to operation 912. In operation 912, the difference signal (y−H*x̄) is filtered. Control then transfers to query operation 914 in the triggering module 320. If the residual signal is greater than a predetermined threshold value, control transfers to operation 916 where a write protect gate is activated. If the residual signal is not greater than the threshold value, the process control transfers back to operation 908 and the monitoring and comparing of the plant model output signal with the control plant output signal continues.

As is shown in FIGS. 3 and 4, the VCM control plant module output "y" is fed back to the servo control module 228 through the second comparator module 310 such that the remaining distance needed to go to reach the track centerline is the actual input to the servo control module 228. For simplicity, this portion of the operation of the soft shock detector is omitted from the diagram in FIG. 9.

In summary, an exemplary embodiment of the present invention (such as 300 or 400) may be viewed as a method of detecting a shock event in a disc drive (such as 100). The detected shock event may be used to trigger a write protect gate before the head (such as 118) goes sufficiently off track as to cause write errors. This method basically involves steps of monitoring an actuator voice coil motor (VCM) control plant module output signal (such as in operation 906), monitoring an actuator voice coil motor (VCM) plant model module output signal (such as in operation 904), comparing the VCM control plant model module output signal to the VCM control plant module output signal (such as in operation 908) to produce a difference signal (such as in operation 910), and triggering a write protect gate (such as in operation 916) if the difference signal exceeds a predetermined threshold value. In particular, note that the VCM control plant module (such as 302) is sensitive to a shock event and the VCM plant model module (such as 304) is less insensitive to the shock event.

The monitoring step may include providing an input to a servo control module (such as 228) from the target track, directing an output from the servo control module (such as in operation 902) to both the VCM control plant module (such as 302) and the VCM plant model module (such as 304 or 404), and sending the VCM control plant module output to the input of the servo control module (such as 228) through a comparator module (such as 310). The comparing step (such as in operations 910 and 912) may include returning the difference signal to an input of the VCM plant model module and filtering the difference signal (such as in operation 912) for triggering the write protect gate.

The method preferably further includes a step of feeding the VCM control plant module output signal back to an input to the VCM control plant module (such as 302) and steps of providing an input to a servo control module (such as 228), directing an output from the servo control module (such as 228) to both the VCM control plant module (such as 302) and the VCM plant model module (such as 304) (such as in operations 904 and 906, and sending the VCM control plant module output to the input of the servo control module through a comparator module (such as 310).

Alternatively, an embodiment of the present invention may be viewed as a control system in software or firmware (such as 300 and 400) for detecting a shock event in a disc drive (such as 100). The system (such as 300 or 400) includes a voice coil motor (VCM) plant module (such as 302) that is sensitive to a shock event and provides a VCM control plant module output, a voice coil motor (VCM) plant model module (such as 304) that is insensitive to the shock event, producing a VCM plant model module output. The system also has a first comparator module (such as 312) coupled to receive the VCM control plant module output and the VCM plant model module output that is operable to generate a difference signal (such as in operation 910) between the model plant module output and the VCM control plant module output (such as 314). The system may also include a triggering module (such as 309 and 320) receiving the difference signal (such as 318) for generating a write protect gate signal if the difference signal exceeds a predetermined shock threshold.

The system may also include a servo control module (such as 228) receiving a desired track input signal through a second comparator module (such as 310) and generating an input to both the VCM control plant module (such as 302) and the VCM plant model module (such as 304). The second comparator module (such as 310) receives the VCM control plant module output and the desired track and generates as the input to the servo control module (such as 228) a difference signal between the VCM control plant module output and the desired track.

An embodiment of the present invention may also be viewed as a system for preventing a write operation to a disc in a disc drive during a shock event that includes an actuator voice coil motor (VCM) plant module (such as 302) generating an output signal sensitive to an external shock event and means for comparing a VCM plant model module output signal that is insensitive to the external shock event to the VCM control plant module output signal (such as in operation 908) to produce a difference or residual signal (such as in operations 910 through 912) and triggering a write protect gate if the difference signal exceeds a predetermined threshold value (such as in operation 916).

The means for comparing may include a VCM plant model module (such as 304) generating the VCM plant model module output signal; and a comparator (such as 314) receiving the VCM control plant module output and the VCM plant model module output signal and producing the difference signal, and a triggering module (such as 309 or 320) receiving the difference signal operable to generate the write protect gate. The system may also have a servo control module (such as 228) having an input and having an output directed to both the VCM control plant module (such as 302) and directed to the actuator VCM plant model module (such as 304). The system may also include a feedback signal (such as 406) as an input to the VCM plant model module (such as 404) from the difference signal. This signal is compared to the VCM plant model module output signal (such as in operation 908) and is fed to the comparator receiving the VCM control plant module output signal to generate the residual signal (such as in operation 910).

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the criteria utilized for triggering a write protect gate may be different than as above described, typically which are based on the ResidualH signal. Other modules may also be inserted within the scheme as shown in FIGS. 3 and 4 to condition the signals and finely tone the estimated values in order to further anticipate movement of the head 118 away from track center. Numerous other changes may be made which will readily suggest themselves to those skilled in the art and which are encompassed in the spirit of the invention disclosed and as defined in the appended claims.

What is claimed is:

1. A control method for controlling a voice coil motor (VCM), the method comprising the steps of:
    inputting a common servo control signal to both a VCM plant and a VCM plant model;
    summing an output from the VCM plant and a disturbance value to derive an actual position signal;
    comparing the actual position signal to an output of the VCM plant model to derive an estimated disturbance signal; and
    using the estimated disturbance signal to minimize a shock to the system.

2. The method of claim 1, wherein the using step comprises the steps of comparing the estimated disturbance signal to a threshold value, and preventing a data transfer operation in relation to said comparison.

3. The method of claim 1, wherein the using step comprises steps of generating a write protect signal which inhibits a write operation, said write protect signal generated before the VCM moves beyond a threshold distance.

4. The method of claim 3 wherein the estimated disturbance signal is an input to the VCM plant model.

5. The method of claim 1 wherein the using step is responsive to a shock.

6. A method comprising the step of generating a write protect signal in response to an estimated disturbance signal that is derived from comparing a VCM plant model output to an actual position signal that is in turn derived from summing a VCM plant output with a disturbance value, wherein the VCM plant model output and the VCM plant output are results of a common servo control signal.

7. The method of claim 6 wherein the generating step comprises:
    comparing the estimated disturbance signal to a threshold value; and
    generating the write protect signal if the estimated disturbance signal exceeds the threshold value.

8. The method of claim 7 further comprising the step of filtering the estimated disturbance signal.

9. The method of claim 6 wherein the write protect signal is generated before the VCM moves beyond a threshold distance.

10. The method of claim 6 wherein the write protect signal is generated independent of a position error signal.

11. The method of claim 6 wherein the comparison of actual position signal to estimated position signal is an input to the VCM plant model.

12. A method comprising the step of generating a write protect signal before a positioning device moves beyond a threshold distance from a desired position, in response to an estimated disturbance signal that is derived by comparing an actual position signal derived from summing a positioning device plant output and a disturbance value to an estimated position signal from a positioning device plant model output.

13. The method of claim 12 comprising inputting the results of the comparing the actual position signal to the estimated position signal to the positioning device plant model.

14. The method of claim 12 wherein the generating step is responsive to a shock.

15. The method of claim 12 wherein the generating step comprises:
    comparing the estimated disturbance signal to a threshold value; and
    generating the write protect signal if the estimated disturbance signal exceeds the threshold value.

16. The method of claim 12 further comprising the step of filtering the estimated disturbance signal.

17. The method of claim 12 wherein the write protect signal is generated independent of a position error signal.

18. The method of claim 12 wherein the write protect signal is usable to control a storage system.

19. The method of claim 12 wherein the positioning device plant output and the positioning device plant model output are results of a common servo control signal.

20. The method of claim 12 wherein the estimated disturbance signal is a result of a common servo control signal to the positioning device plant and the positioning device plant model.

21. A control system comprising:
    a positioning device plant model responsive to a servo control module;
    a positioning device plant responsive to the servo control module; and
    a shock detector configured to generate a write protect gate signal if an estimated disturbance signal exceeds a predetermined threshold, wherein the estimated disturbance signal is derived by comparing an output of the positioning device plant model to an output of the positioning device plant.

22. The control system of claim 21 wherein the positioning device plant is associated with a voice coil motor.

23. The control system of claim 21 further comprising a filter for filtering the estimated disturbance signal.

24. The control system of claim 21 wherein the estimated disturbance signal represents a difference between the positioning device plant model output and a sum of the positioning device plant output and a disturbance value.

25. The control system of claim 21 further comprising a servo control module coupled to the positioning device plant and the positioning device plant model.

26. The control system of claim 25 wherein the servo control module is coupled to receive a reference signal.

* * * * *